US010923108B2

(12) United States Patent
Kamei

(10) Patent No.: US 10,923,108 B2
(45) Date of Patent: Feb. 16, 2021

(54) INFORMATION PROCESSING SYSTEM AND NON-TRANSITORY COMPUTER READABLE MEDIUM STORING PROGRAM

(71) Applicant: FUJI XEROX CO., LTD., Tokyo (JP)

(72) Inventor: Mitsuhisa Kamei, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 175 days.

(21) Appl. No.: 16/162,406

(22) Filed: Oct. 17, 2018

(65) Prior Publication Data

US 2019/0259373 A1 Aug. 22, 2019

(30) Foreign Application Priority Data

Feb. 16, 2018 (JP) ............................ JP2018-026224

(51) Int. Cl.

*G10L 15/00* (2013.01)
*G10L 21/0332* (2013.01)
*G10L 17/22* (2013.01)
*G06F 9/50* (2006.01)
*G06F 40/40* (2020.01)
*G10L 15/28* (2013.01)

(52) U.S. Cl.

CPC ............ *G10L 15/005* (2013.01); *G06F 9/505* (2013.01); *G06F 40/40* (2020.01); *G10L 17/22* (2013.01); *G10L 21/0332* (2013.01); *G10L 15/28* (2013.01)

(58) Field of Classification Search

None

See application file for complete search history.

(56) References Cited

U.S. PATENT DOCUMENTS 6,285,977 B1 9/2001 Miyazaki
6,604,101 B1 * 8/2003 Chan .................... G06F 16/951 707/706
10,176,171 B1 * 1/2019 Patterson ............... G06F 9/454
2001/0023439 A1 * 9/2001 Miyazaki ............... G06F 9/505 709/225

(Continued)

FOREIGN PATENT DOCUMENTS

JP H076142 1/1995
JP H08137697 5/1996
JP H11212831 8/1999

*Primary Examiner* — Jonathan C Kim
(74) *Attorney, Agent, or Firm* — JCIPRNET

(57) ABSTRACT

An information processing system includes plural processing modules that execute processes for a processing target based on functions thereof, plural management units that manage the processing modules, and a memory that stores information on the functions of the processing modules in association with identification information on the management units and identification information on the processing modules. Each of the management units includes a determining unit that determines a processing plan including at least a subsequent process based on the processing target, storage contents of the memory, and history information on a process that has been executed for the processing target, and a requesting unit that requests a process by transmitting, to one of the management units that manages a processing module that executes the subsequent process, a processing object including the processing target, the history information, and identification information on the processing module that executes the subsequent process.

11 Claims, 13 Drawing Sheets

(56) References Cited

U.S. PATENT DOCUMENTS

| | | | | |
|---|---|---|---|---|
| 2013/0346063 | A1* | 12/2013 | Chen | G06F 40/20<br>704/3 |
| 2014/0082501 | A1* | 3/2014 | Bae | G06F 3/167<br>715/728 |
| 2014/0244712 | A1* | 8/2014 | Walters | G06F 3/167<br>709/202 |
| 2015/0348551 | A1* | 12/2015 | Gruber | G10L 15/28<br>704/235 |
| 2016/0034448 | A1* | 2/2016 | Tran | G06F 40/30<br>704/277 |
| 2017/0091175 | A1* | 3/2017 | Kanayama | G06F 16/345 |
| 2017/0124071 | A1* | 5/2017 | Huang | G06F 40/44 |
| 2017/0186429 | A1* | 6/2017 | Giuli | G10L 15/22 |
| 2017/0293610 | A1* | 10/2017 | Tran | G06Q 10/025 |
| 2018/0113857 | A1* | 4/2018 | Mora Lopez | G06F 9/5055 |

* cited by examiner

| MODULE ID | PROCESS TYPE | INPUT STATE | OUTPUT STATE |
|---|---|---|---|
| S101 | SPEECH RECOGNITION | SPEECH WAVEFORM (JAPANESE) | JAPANESE TEXT (ALL) |
| S102 | SPEECH RECOGNITION | SPEECH WAVEFORM (ENGLISH) | ENGLISH TEXT (ENGLISH) |
| S201 | CONTEXT RECOGNITION | SPEECH WAVEFORM (ALL) | SIGNAL (ENVIRONMENT) |
| S301 | CHARACTER RECOGNITION | IMAGE (JAPANESE TEXT) | JAPANESE TEXT (ALL) |
| S351 | CHARACTER RECOGNITION | ENGLISH TEXT (QUESTION) | SQL QUERY (QUESTION) |
| S401 | TRANSLATION | JAPANESE TEXT (ALL) | CHINESE TEXT (ALL) |
| S402 | TRANSLATION | ENGLISH TEXT (ALL) | JAPANESE TEXT (ALL) |
| S403 | TRANSLATION | JAPANESE TEXT (ALL) | ENGLISH TEXT (ALL) |
| S403b | TRANSLATION | JAPANESE TEXT (ALL) | ENGLISH TEXT (ALL) |
| S404 | TRANSLATION | ENGLISH TEXT (ALL) | CHINESE TEXT (ALL) |
| S411 | TRANSLATION | SPEECH WAVEFORM (ALL) | JAPANESE SPEECH (ALL) |
| S352 | SPEECH RECOGNITION | ENGLISH SPEECH (QUESTION) | SQL QUERY (QUESTION) |
| S711 | MEDICAL DIAGNOSIS | ENGLISH TEXT (QUESTION) | ENGLISH TEXT (MEDICAL ANSWER) |
| S801 | FAILURE DIAGNOSIS | SQL QUERY (QUESTION) | ENGLISH TEXT (FAILURE ANSWER) |
| S901 | INTENTION UNDERSTANDING | JAPANESE (TEXT) | VARIABLE x |
| S902 | INTENTION UNDERSTANDING | ENGLISH (TEXT) | VARIABLE y |

| COMPUTER NAME (PROCESSING MANAGEMENT UNIT NAME) | MODULE ID |
|---|---|
| COMPUTER A (PROCESSING MANAGEMENT UNIT A) | ⋮ |
| COMPUTER B (PROCESSING MANAGEMENT UNIT B) | ⋮ |
| COMPUTER C (PROCESSING MANAGEMENT UNIT C) | ⋮ |
| ⋮ | ⋮ |

| PROCESSING REQUIREMENTS |
|---|
| -PROCESSING TIME LIMIT: ······<br>-PRIORITY: ······<br>-PREFERENCES/PERMISSIBLE COST: ······<br>-PROCESSING GOAL: ······<br>    -OUTPUT RESULT FORMAT: ······<br>    -PRESENTATION METHOD: ······ |
| PROCESSING TARGET DATA |
| -INITIAL DATA: ······<br>-INTERMEDIATE PROCESSING RESULT: ······<br>-FINAL PROCESSING RESULT: ······ |
| PROCESSING HISTORY |
| -SCHEDULING STATUS: ······<br>-INTERMEDIATE PROCESSING REQUEST STATUS: ······<br>S1: ······<br>S2:<br>S3:<br>S4:<br>S5:<br>⋮ |

| SEARCH CONDITION (CONTENTS) | PROCESS QUEUE | PROCESSING HISTORY |
|---|---|---|
| CHINESE TEXT (NOT DETERMINED) | S101-S401 | S101 (TIME, RESULT) |
| ENGLISH TEXT (NOT DETERMINED) | S101-S403 | S101 (TIME, RESULT) |
| JAPANESE TEXT (NOT DETERMINED) | S101 | S101 (TIME, RESULT) |
| SPEECH WAVEFORM (JAPANESE) | — | — |

| SEARCH CONDITION (CONTENTS) | PROCESS QUEUE |
|---|---|
| SPEECH WAVEFORM (JAPANESE) | S101 |
| IMAGE (JAPANESE) | S301 |
| ENGLISH TEXT | S402 |
| JAPANESE TEXT (MEDICAL ANSWER) | — |

| PROCESSING REQUIREMENTS |
|---|
| -PROCESSING TIME LIMIT: ……<br>-PRIORITY: ……<br>-PREFERENCES/PERMISSIBLE COST: ……<br>-PROCESSING GOAL: ……<br>  -OUTPUT RESULT FORMAT: ……<br>  -PRESENTATION METHOD: …… |
| PROCESSING TARGET DATA |
| -INITIAL DATA: ……<br>-INTERMEDIATE PROCESSING RESULT: ……<br>-FINAL PROCESSING RESULT: …… |
| PROCESSING HISTORY |
| -SCHEDULING STATUS: S101 → S901 → S403 → S711 → S402; S102 → S901; S901 → S403b → S711<br><br>-INTERMEDIATE PROCESSING REQUEST STATUS<br>S1: PROCESSING MANAGEMENT UNIT A REQUESTED S101 AND S102 TO EXECUTE PROCESSES AT 7:50:13 ON AUGUST 15.<br>S2: PROCESSING MANAGEMENT UNIT A RECEIVED NORMAL PROCESSING RESULT FROM S101 AT 7:50:19 ON AUGUST 15.<br>S3: PROCESSING MANAGEMENT UNIT A REQUESTED S901 TO EXECUTE PROCESS AT 7:50:20 ON AUGUST 15.<br>S4: PROCESSING MANAGEMENT UNIT A RECEIVED NORMAL PROCESSING RESULT FROM S901 AT 7:50:21 ON AUGUST 15.<br>S5: PROCESSING MANAGEMENT UNIT A REQUESTED S403 AND S403b TO EXECUTE PROCESSES AT 7:50:22 ON AUGUST 15.<br>S6: PROCESSING MANAGEMENT UNIT B RECEIVED NORMAL PROCESSING RESULT FROM S403 AT 7:50:23 ON AUGUST 15.<br>S7: PROCESSING MANAGEMENT UNIT B REQUESTED S402 TO EXECUTE PROCESS AT 7:50:26 ON AUGUST 15.<br>⋮ |

PROCESSING REQUIREMENTS

- -PROCESSING TIME LIMIT: ......
- -PRIORITY: ......
- -PREFERENCES/PERMISSIBLE COST: ......
- -PROCESSING GOAL: ......
  - -OUTPUT RESULT FORMAT: ......
  - -PRESENTATION METHOD: ......

PROCESSING TARGET DATA

- -INITIAL DATA: ......
- -INTERMEDIATE PROCESSING RESULT: ......
- -FINAL PROCESSING RESULT: ......

PROCESSING HISTORY

-SCHEDULING STATUS: S101 → S901 → S403 → S711 → S402
S102 ↗ (to S901); S901 ↘ S403b ↗ (to S711)

-INTERMEDIATE PROCESSING REQUEST STATUS

S1: PROCESSING MANAGEMENT UNIT A REQUESTED S101 AND S102 TO EXECUTE PROCESSES AT 7:50:13 ON AUGUST 15.

S2: PROCESSING MANAGEMENT UNIT A RECEIVED NORMAL PROCESSING RESULT FROM S101 AT 7:50:19 ON AUGUST 15.

S3: PROCESSING MANAGEMENT UNIT A REQUESTED S901 TO EXECUTE PROCESS AT 7:50:20 ON AUGUST 15.

S4: PROCESSING MANAGEMENT UNIT A RECEIVED NORMAL PROCESSING RESULT FROM S901 AT 7:50:21 ON AUGUST 15.

S5: PROCESSING MANAGEMENT UNIT A REQUESTED S403 AND S403b TO EXECUTE PROCESSES AT 7:50:22 ON AUGUST 15.

S6: PROCESSING MANAGEMENT UNIT C RECEIVED NORMAL PROCESSING RESULT FROM S403b AT 7:50:24 ON AUGUST 15.

S7: PROCESSING MANAGEMENT UNIT C REQUESTED S402 TO EXECUTE PROCESS AT 7:50:28 ON AUGUST 15.

PROCESSING REQUIREMENTS

-PROCESSING TIME LIMIT: ......
-PRIORITY: ......
-PREFERENCES/PERMISSIBLE COST: ......
-PROCESSING GOAL: ......
  -OUTPUT RESULT FORMAT: ......
  -PRESENTATION METHOD: ......

PROCESSING TARGET DATA

-INITIAL DATA: ......
-INTERMEDIATE PROCESSING RESULT: ......
-FINAL PROCESSING RESULT: ......

PROCESSING HISTORY

-SCHEDULING STATUS: S101 → S901 → S403 → S711 → S402
S102 ↗ (to S901); S901 ↘ S403b ↗ (to S711)

-INTERMEDIATE PROCESSING REQUEST STATUS
S1: PROCESSING MANAGEMENT UNIT A REQUESTED S101 AND S102 TO EXECUTE PROCESSES AT 7:50:13 ON AUGUST 15.
S2: PROCESSING MANAGEMENT UNIT A RECEIVED NORMAL PROCESSING RESULT FROM S101 AT 7:50:19 ON AUGUST 15.
S3: PROCESSING MANAGEMENT UNIT A REQUESTED S901 TO EXECUTE PROCESS AT 7:50:20 ON AUGUST 15.
S4: PROCESSING MANAGEMENT UNIT A RECEIVED NORMAL PROCESSING RESULT FROM S901 AT 7:50:21 ON AUGUST 15.
S5: PROCESSING MANAGEMENT UNIT A REQUESTED S403 AND S403b TO EXECUTE PROCESSES AT 7:50:22 ON AUGUST 15.
S6: PROCESSING MANAGEMENT UNIT C RECEIVED NORMAL PROCESSING RESULT FROM S403b AT 7:50:24 ON AUGUST 15.
S7: PROCESSING MANAGEMENT UNIT C REQUESTED S402 TO EXECUTE PROCESS AT 7:50:28 ON AUGUST 15.
S8: PROCESSING MANAGEMENT UNIT A ADOPTED PROCESSING RESULT FROM S403 AND RECEIVED NORMAL PROCESSING RESULT AT 7:50:30 ON AUGUST 15.
S9: PROCESSING MANAGEMENT UNIT A TRANSMITTED PROCESSING RESULT TO OUTSIDE AT 7:50:33 ON AUGUST 15.

⋮

INFORMATION PROCESSING SYSTEM AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-026224 filed Feb. 16, 2018.

BACKGROUND

(i) Technical Field

The present disclosure relates to an information processing system and a non-transitory computer readable medium storing a program.

(ii) Related Art

In recent years, there has been proposed an autonomous distributed system in which a plurality of agents process a task by cooperating with each other through communication (see, for example, Japanese Unexamined Patent Application Publication No. 8-137697).

In the autonomous distributed system described in Japanese Unexamined Patent Application Publication No. 8-137697, the plurality of agents process a task by cooperating with each other through communication in accordance with predetermined system properties. The agents are subsystems that operate autonomously in a computer system and substitute for humans to execute various determinations and operations. Each agent has knowledges on its task processing capability and on task processing capabilities of the other agents. The agents determine assignments of task processing by autonomously negotiating with each other based on the respective knowledges. Each agent executes the task processing in accordance with the determined assignment and observes a processing result. Each agent estimates a change in the system properties based on information exchange with the other agents and also based on a result of the observation. Each agent consecutively updates its knowledge based on the estimated change in the system properties.

SUMMARY

Aspects of non-limiting embodiments of the present disclosure relate to an information processing system and a non-transitory computer readable medium storing a program, in which the occurrence of an unnecessary process may be reduced without adding an adjustment process among a plurality of management agents in a configuration in which processes are executed in an autonomous and distributed manner.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system comprising a plurality of processing modules that execute processes for a processing target based on functions thereof, a plurality of management units that manage the processing modules, and a memory that stores information on the functions of the processing modules in association with identification information on the management units and identification information on the processing modules. Each of the management units comprises a determining unit that determines a processing plan including at least a subsequent process based on the processing target, storage contents of the memory, and history information on a process that has been executed for the processing target, and a requesting unit that requests a process by transmitting, to one of the management units that manages a processing module that executes the subsequent process, a processing object including the processing target, the history information, and identification information on the processing module that executes the subsequent process.

BRIEF DESCRIPTION OF THE DRAWINGS

An exemplary embodiment of the present disclosure will be described in detail based on the following figures, wherein:

FIG. 2 illustrates an example of a module function table;

FIG. 3 illustrates an example of a module management table;

FIG. 4 illustrates an example of a processing object;

FIG. 13A illustrates an example of a processing object recorded by first and second processing management units;

FIG. 13B illustrates an example of a copied processing object; and

FIG. 13C illustrates an example of a processing object recorded by the first processing management unit in such a manner that the processing object illustrated in FIG. 13A and the processing object illustrated in FIG. 13B are brought into one processing object.

DETAILED DESCRIPTION

Figure 1:
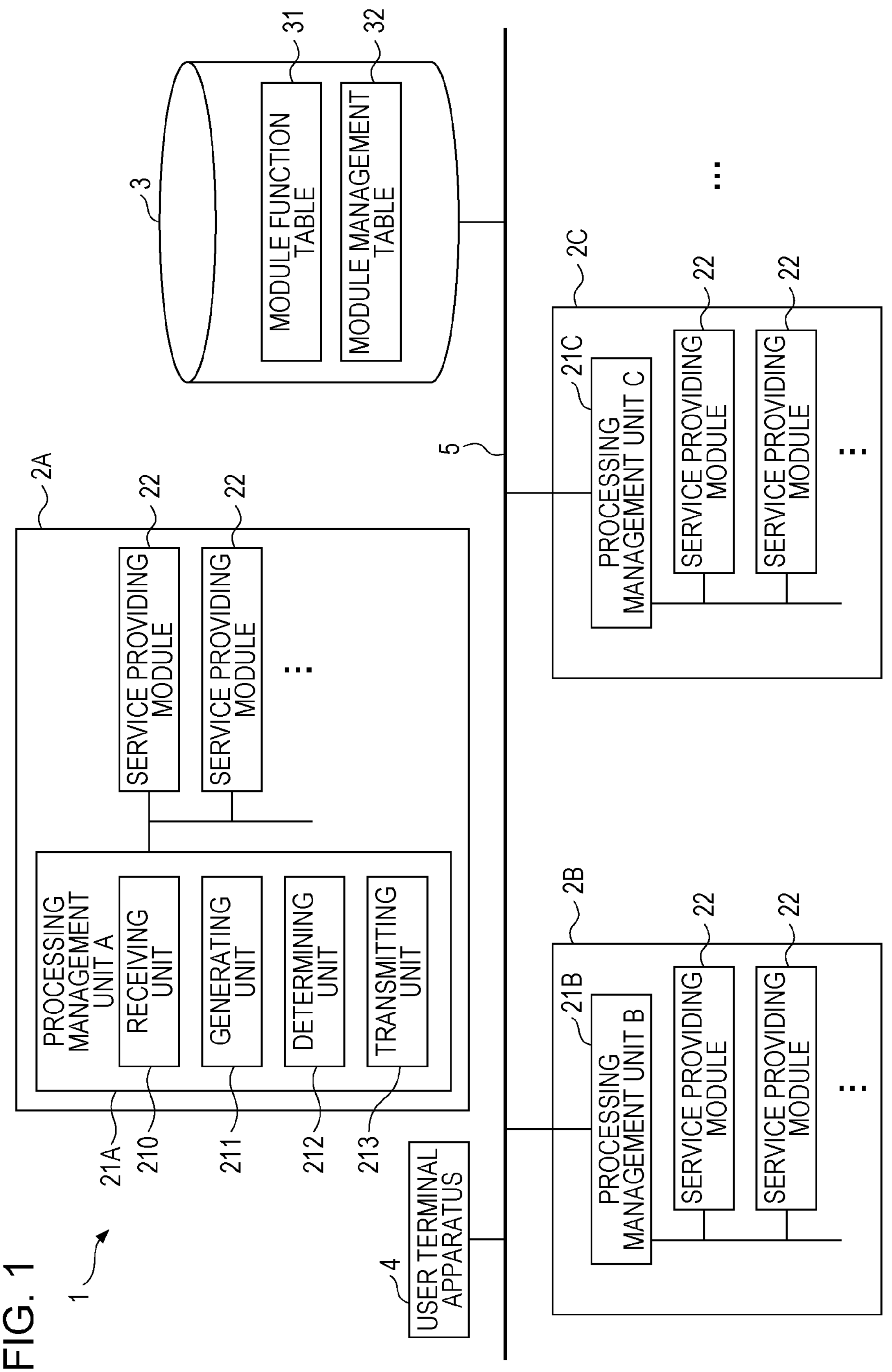
FIG. 1 illustrates an example of the overall configuration of an information processing system according to an exemplary embodiment of the present disclosure.

An exemplary embodiment of the present disclosure is described below with reference to the drawings. In the drawings, components having substantially the same functions are denoted by the same reference symbols to omit redundant description thereof.

Summary of Exemplary Embodiment

According to the exemplary embodiment of the present disclosure, there is provided an information processing system comprising a plurality of processing modules that execute processes for a processing target based on functions thereof, a plurality of management units that manage the processing modules, and a memory that stores information on the functions of the processing modules in association with identification information on the management units and identification information on the processing modules. Each of the management units comprises a determining unit that determines a processing plan including at least a subsequent process based on the processing target, storage contents of the memory, and history information on a process that has been executed for the processing target, and a requesting unit that requests a process by transmitting, to one of the management units that manages a processing module that executes the subsequent process, a processing object including the processing target, the history information, and identification information on the processing module that executes the subsequent process.

The "information processing system" may be configurated by a plurality of apparatuses or by a single apparatus. The "processing target" is a target to be processed by the processing module. Examples thereof include speech, gesture, an image, and text. The "processing module" is each individual component that configurates hardware or software for executing a process based on its function. The "process" includes a case of executing any process such as data format conversion (for example, speech to text) for the processing target and a case of understanding the meaning of the processing target and operating based on the meaning obtained through the understanding. The "processing object" is exchanged between the management units. Examples of the format thereof include contents of communication between processes if the management units are processes, a request to and a response from Web API, and an object stored as a DB entry if stored temporarily. Other formats may be employed as well.

Exemplary Embodiment

FIG. 1 illustrates an example of the overall configuration of an information processing system according to an exemplary embodiment of the present disclosure.

An information processing system 1 includes a plurality of information processing apparatuses 2A, 2B, 2C, . . . (hereinafter may be referred to collectively as "information processing apparatus 2") configurated by a computer A, a computer B, a computer C, . . . , respectively, a database 3 that is configurated by a storage apparatus such as a hard disk and stores various types of information, and a user terminal apparatus 4 that is used by a user. The information processing system 1 has a configuration in which the information processing apparatuses 2 execute processes in an autonomous and distributed manner. The database 3 may be provided in each information processing apparatus 2. The database 3 is an example of the memory.

The information processing apparatus 2, the database 3, and the user terminal apparatus 4 are connected to each other via a network 5. The network 5 is a communication network such as a local area network (LAN) or the Internet through which data is exchanged by wired communication and wireless communication.

(Configuration of Information Processing Apparatus)

The information processing apparatuses 2A, 2B, 2C, . . . include processing management units 21A, 21B, 21C, . . . (hereinafter may be referred to collectively as "processing management unit 21"), respectively. A plurality of service providing modules 22 are connected to the processing management unit 21. A single service providing module 22 may be connected to the processing management unit 21. The processing management unit 21 is an example of the management unit. The service providing module 22 is an example of the processing module.

The information processing apparatus 2 includes components as a computer, that is, includes a CPU, an interface, and a storage part implemented by a ROM, a RAM, and a hard disk. The CPU executes a program stored in the storage part to function as the processing management unit 21 and as a receiving unit 210, a generating unit 211, a determining unit 212, and a transmitting unit 213 that configurate the processing management unit 21. In FIG. 1, illustration of detailed configurations of the processing management units 21B and 21C of the information processing apparatuses 2B and 2C is omitted. The receiving unit 210 is an example of a request receiving unit. The transmitting unit 213 is an example of the requesting unit.

The service providing modules 22 are distributed in each information processing apparatus 2. The service providing module 22 has any one of functions shown in a module function table 31 described later (see FIG. 2). The service providing module 22 provides a service by executing a process based on its function. The service provided by the service providing module 22 may take effect alone without cooperation with other service providing modules 22. The service providing module 22 may have a function other than those illustrated in FIG. 2. The service providing modules 22 managed by each processing management unit 21 may have the same function.

In response to an instruction from the transmitting unit 213 of the processing management unit 21 described later, the service providing module 22 processes processing target data and transmits a processing result to the transmitting unit 213. When the service providing module 22 has failed to process the processing target data or processed the processing target data improperly, the service providing module 22 transmits a processing result including an error to the transmitting unit 213.

(Configuration of Database)

For example, the database 3 stores the module function table 31 (see FIG. 2) showing the functions of the service providing modules 22, and a module management table 32 (see FIG. 3) showing management agents of the service providing modules 22. Details of the tables 31 and 32 are described later. The module function table 31 and the module management table 32 may be configurated by a single table.

(Configuration of User Terminal Apparatus)

The user terminal apparatus 4 requests a process by inputting information including processing target data and request details (hereinafter referred to also as "input information") to any one of the information processing apparatuses 2, and receives a processing result from any one of the information processing apparatuses 2 or from a specified location. The input information includes initial data and processing requirements including a processing time limit, a priority, preferences/permissible cost, and a processing goal (including an output result format and a presentation method). The input information is recorded in a processing object 33 described later. The processing requirements may be omitted entirely or partly. Processing requirements that are not recorded may be set by default. The input information is an example of a processing request including the processing target and the request details. The initial data is an example of the processing target. The processing requirements are examples of the request details.

The user terminal apparatus 4 includes devices with which the input information may be input to the information processing apparatus 2. As examples of those devices, the user terminal apparatus 4 includes a keyboard to be used for inputting text, a microphone to be used for inputting speech, and a camera to be used for inputting gesture.

The user terminal apparatus 4 includes devices with which the processing result may be received. As examples of those devices, the user terminal apparatus 4 includes a display such as a liquid crystal display that displays the processing result, a printer that prints the processing result, and a storage medium such as a semiconductor memory or a hard disk that stores the processing result.

(Configuration of Module Function Table)

FIG. 2 illustrates an example of the module function table 31. The module function table 31 has items such as "module ID", "process type", "input state", and "output state". The item "module ID" is identification information for uniquely identifying the service providing module 22. The item "process type" is a type of a process that may be implemented by the function of the service providing module 22. The item "input state" is a state of information to be input to the service providing module 22. The item "output state" is a state of information to be output after the service providing module 22 has processed the input information.

(Configuration of Module Management Table)

FIG. 3 illustrates an example of the module management table 32. The module management table 32 has items such as "computer name (processing management unit name)" in which computer names (or processing management unit names) are recorded, and "module ID" in which module IDs for identifying the service providing modules 22 are recorded. The module IDs for identifying the service providing modules 22 managed by the processing management units 21 are recorded in the module management table 32.

(Configuration of Processing Object)

FIG. 4 illustrates an example of the processing object. The processing object 33 is generated by the generating unit 211.

The processing object 33 has items such as "processing requirements", "processing target data", and "processing history".

The item "processing requirements" has items such as "processing time limit" (for example, "within one minute" or "by today"), "priority" (for example, "processing time oriented", "accuracy oriented", or "minimize necessary electric power"), "preferences/permissible cost" (for example, "CPU usage time" or "communication data amount"), and "processing goal". The item "processing time limit" is a time from a request for a process to an output of a final processing result. The item "processing time oriented" indicates that, when a plurality of options are provided, an option shorter in processing time is adopted with higher priority than the others. The item "accuracy oriented" indicates that, when a plurality of options are provided, an option higher in accuracy is adopted with higher priority than the others. The item "minimize necessary electric power" indicates that, when a plurality of options are provided, an option that requires minimum electric power for a process is adopted. The item "preferences/permissible cost" is preferences other than the time limit or permissible matters related to cost when a process is executed. The item "processing goal" is the final processing result. The item "processing goal" has items such as "output result format" (for example, "translation to English text") and "presentation method" (for example, "display on main screen"). The item "output result format" is a format of the processing result that the user desires to output.

The item "processing target data" has items such as "initial data" (for example, Japanese speech waveform data input from the user terminal apparatus 4), "intermediate processing result" (for example, Japanese text that is a result of recognition of S101 illustrated in FIG. 2), and "final processing result" (for example, Chinese text that is a result of translation of S401 illustrated in FIG. 2). The "processing result" refers to the intermediate processing result, which may be the final processing result. The "processing history" is information related to the processing target data that has been processed. Examples thereof include information indicating a type of a process (process type), a person who has executed the process, and the time when the process has been executed.

The item "processing history" has items such as "scheduling status" and "intermediate processing request status". In the item "scheduling status", there is recorded at least a module ID of a service providing module 22 that executes a subsequent process. Alternatively, there are recorded module IDs of a plurality of service providing modules 22 that execute a series of processes as a processing schedule to achieve the processing goal. The subsequent process and the processing schedule are determined by the determining unit 212. In the item "scheduling status", there may be recorded module IDs of a plurality of service providing modules 22 that execute a series of processes before achievement of the processing goal. In the item "intermediate processing request status", there is recorded a status related to a processing management unit 21 that has given a request, a service providing module 22 that has received the request (including service providing modules 22 managed by the requesting processing management unit 21), the time when the request is given, and the time when the processing management unit 21 has received a normal processing result. The information recorded in the item "intermediate processing request status" is an example of the history information.

Next, details of the units 210 to 213 that configurate the processing management unit 21 are described. The processing management unit 21 executes a process in accordance with a predetermined processing condition.

The receiving unit 210 receives input information transmitted from the user terminal apparatus 4. The receiving unit 210 also receives a processing object 33 transmitted from another processing management unit 21.

Based on the input information received by the receiving unit 210, the generating unit 211 generates a processing object 33 by recording items related to the input information in the processing object 33 illustrated in FIG. 4. That is, the processing object 33 is generated by the information processing apparatus 2 that has received the input information.

Based on the input information, the module function table 31, the module management table 32, and the processing object 33, the determining unit 212 determines at least a subsequent process. When a processing schedule including processes up to a processing goal may be determined, the determining unit 212 determines the processing schedule. The determining unit 212 records the determined subsequent process or processing schedule in the item "scheduling status" of the processing object 33. The "processing schedule" is an example of a processing plan showing the order of processes to be executed by the service providing modules 22 for processing target data. History information on a process executed in accordance with the processing schedule is recorded in the processing object 33 by the transmitting unit 213. The determining unit 212 may determine the processing schedule even if the processing schedule does not include processes up to the processing goal.

When the service providing module 22 that executes the subsequent process is managed by another processing management unit 21 based on the processing object 33, the transmitting unit 213 requests the process by transmitting the processing object 33 to the other processing management unit 21. When the service providing module 22 that executes the subsequent process is managed by the processing management unit 21 of its own based on the processing object 33, the transmitting unit 213 acquires processing target data from the processing object 33, transmits the processing target data to the service providing module 22, and instructs the service providing module 22 to process the processing target data. When the receiving unit 210 has received a processing object 33 transmitted from another processing management unit 21, the transmitting unit 213 acquires processing target data from the received processing object 33, transmits the processing target data to the service providing module 22 managed by the processing management unit 21 of its own, and instructs the service providing module 22 to process the processing target data. When the service providing module 22 that executes the subsequent process is managed by the processing management unit 21 of its own, the transmitting unit 213 may transmit the processing object 33 to the service providing module 22 without acquiring the processing target data from the processing object 33.

When a processing result has been received from the service providing module 22 managed by the processing management unit 21 of its own and the processing result does not include an error, the transmitting unit 213 records the processing result and history information in the processing object 33. When the processing result has been received from the service providing module 22 managed by the processing management unit 21 of its own, the transmitting unit 213 determines whether the processing result is a final processing result corresponding to the processing goal. When it has been determined that the processing result is the final processing result, the transmitting unit 213 transmits the processing result to the user terminal apparatus 4 or stores the processing result in a specified storage location such as a specified file in the database 3 as desired by the user.

Next, the process of the processing management unit 21 in accordance with the processing condition is described. For example, the processing management unit 21 executes the process in accordance with one of the following processing conditions (a) to (g). The processing conditions (a) to (g) are examples and may include other conditions or may be set to different conditions.

(a) Subsequent Process is Present

For example, the processing condition (a) corresponds to a case in which a subsequent process (including parallel processes) is recorded in the item "scheduling status" of the item "processing history" of the processing object 33. When the processing management unit 21 of its own manages the service providing module 22 that may execute the subsequent process, the transmitting unit 213 of the processing management unit 21 transmits processing target data (initial data or intermediate processing result) to the service providing module 22 managed by the processing management unit 21 of its own and instructs the service providing module 22 to process the processing target data. When another processing management unit 21 manages the service providing module 22 that may execute the subsequent process, the transmitting unit 213 requests the process by transmitting the processing object 33 to the other processing management unit 21.

(b) Output Condition Included in Request Details is Satisfied

For example, the processing condition (b) corresponds to a case in which an intermediate processing result in the item "processing target data" of the processing object 33 has achieved a processing goal in the item "processing requirements". In this case, the service providing module 22 does not grasp whether the processing result is a final processing result. Therefore, the transmitting unit 213 of the processing management unit 21 determines whether the processing result is the final processing result. When it has been determined that the processing result is the final processing result though the processing result is recorded in the processing object 33 as the intermediate processing result, the transmitting unit 213 transmits the intermediate processing result to the user terminal apparatus 4 as the final processing result or stores the intermediate processing result in a specified storage location as the final processing result.

(c) Processing Requirements Include Storage Location of Processing Result or Processing Result is Stored in Need of Further Process For example, the processing condition (c) corresponds to a case in which a storage location of a processing result or its copy is specified in the item "presentation method" of the item "processing requirements" of the processing object 33. In this case, the transmitting unit 213 of the processing management unit 21 stores the processing result or its copy in the specified storage location such as a specified file in the database 3.

(d) Processing Requirements Need Information on External Apparatus

For example, the processing condition (d) corresponds to a case in which, when an answer to a question will be output but the question does not provide sufficient information, the insufficient information is acquired from an external apparatus such as a server. In this case, the receiving unit 210 of the processing management unit 21 acquires the insufficient information from the external apparatus and adds the information to the item "processing target data" of the processing object 33. The external apparatus may be the database 3.

(e) Processing Schedule to Meet Request has not been Determined

For example, the processing condition (e) corresponds to a case in which the processing management unit 21 that has received a processing request has not determined a processing schedule to meet the request. In this case, a processing schedule that may achieve a processing goal is determined during the processing. This case is effective when the processing is complex and a standard processing flow is present. In this case, the determining unit 212 of the processing management unit 21 determines the processing schedule that may achieve the processing goal and records the determined processing schedule in the item "scheduling status" of the processing object 33. When the processing goal is known from the beginning as in a case in which the processing goal is achieved by one process, the processing schedule need not be generated. When the processing management unit 21 that has received the processing request may determine the processing schedule to meet the request, the processing management unit 21 may determine the processing schedule.

(f) Processing Conditions have not been Satisfied

The processing condition (f) corresponds to a case in which necessary information is not completely obtained in the item "intermediate processing result" of the item "processing target data" of the processing object 33 or in which the processing timing has not come. In this case, the transmitting unit 213 of the processing management unit 21 stores the processing object 33 in the database 3, processes the processing object 33 as necessary and stores the processing object 33 in the database 3, or transmits the processing object 33 to another processing management unit 21 or to a service providing module 22 that executes a storage process.

(g) Redundant Process has been Detected

A process to be executed when a redundant process has been detected (referred to also as "redundancy detection process") is described.

When a process shown in the processing object 33 is executed, processing results obtained by a plurality of service providing modules 22 may be compared or one of the processing results may be adopted based on a criterion for determination, such as a processing accuracy or a processing end time. In this case, a processing request may be given not only to a service providing module 22 managed by the processing management unit 21 of its own but also to a service providing module 22 managed by another processing management unit 21. When processes shown in processing objects 33 managed by the different processing management units 21 progress and proceed to subsequent processes, the processing objects 33 based on the same processing request may be transmitted as requests to service providing modules 22 having the same function in the subsequent steps through different routes. When the respective processing objects 33 have no processing histories, determination fails as to whether the subsequent processes need to be executed redundantly or may be executed integrally.

When it has been determined that parallel processes are executed, for example, a processing management unit A sets, in the processing object 33 as a processing history, a record showing that a processing request has been branched into those for a service providing module "a" that has a module ID "S403" and is managed by a processing management unit B and a service providing module "b" that has a module ID "S403*b*" and is managed by a processing management unit C.

When the processing management unit B and the processing management unit C have received the processing requests, the processing management unit B and the processing management unit C refer to process types and processing histories. When there is a history that a request has been made by branching a process into a plurality of processes, the processing management unit B and the processing management unit C check whether a similar branch has been made for other processes. When requests branched from the same request have been found, the processing management unit B and the processing management unit C stop redundant processes depending on details and add one processing result as a processing result for the plurality of requests. If possible, the processing management unit B and the processing management unit C connect the plurality of branched processes to one processing request, thereby avoiding redundant processes.

In the example described above, a processing object 33 including a processing result obtained by the service providing module "a" having the module ID "S403" is transmitted from the processing management unit B to the processing management unit A. Simultaneously, a processing object 33 including a processing result obtained by the service providing module "b" having the module ID "S403*b*" is transmitted from the processing management unit C to the processing management unit A. In this case, the item "intermediate processing request status" of each processing object 33 has a record showing that the processing result has been copied. Therefore, the results are output as results of the same process and displayed side by side on the user terminal apparatus 4. In the case of "processing accuracy oriented", both the results are compared, integrated (complemented) depending on details, and output to and displayed on the user terminal apparatus 4. In the case of "processing time oriented", the result obtained earlier is output to and displayed on the user terminal apparatus 4 and the result obtained later is discarded. In this manner, determination may be made for the subsequent process.

Operation of Exemplary Embodiment

Next, an example of an operation of the information processing system 1 is described.

(1) Overall Flow

Figure 5:
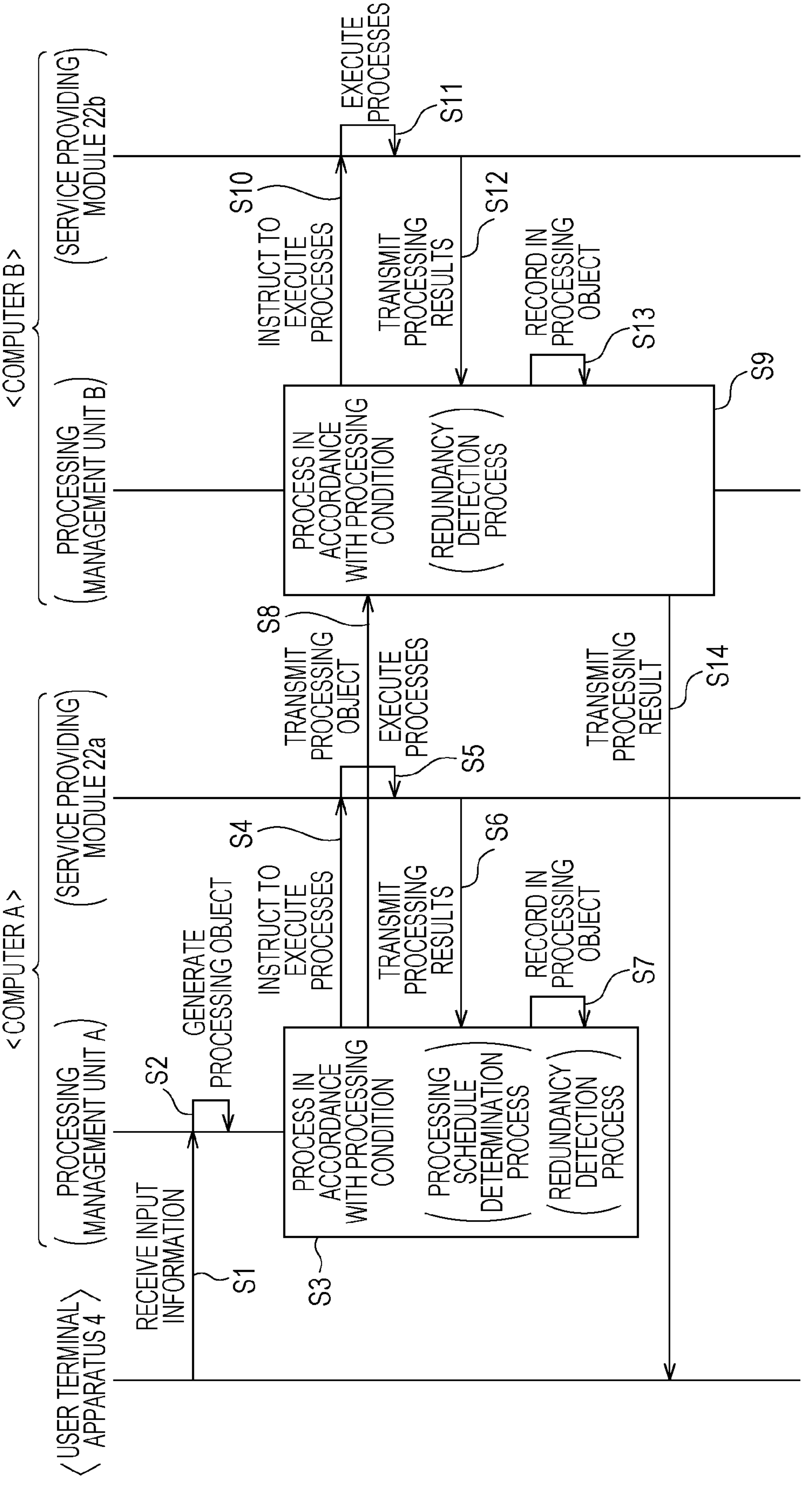
FIG. 5 is a timing chart illustrating an example of an overall operation of the information processing system.

FIG. 5 is a timing chart illustrating an example of an overall operation of the information processing system 1. The processing management unit A of the information processing apparatus 2 configurated by the computer A receives a processing request.

The receiving unit 210 of the processing management unit A of the information processing apparatus 2 receives input information including processing target data and request details from the user terminal apparatus 4 (S1).

The generating unit 211 of the processing management unit A that has received the input information generates a processing object 33 based on the input information, the module function table 31, and the module management table 32 and the determining unit 212 determines a processing schedule based on the processing object 33 (S2). The processing schedule is determined so that a service providing module 22*a* managed by the processing management unit A executes a process and then a service providing module 22*b* managed by the processing management unit B executes a process.

Next, the processing management unit A executes a process in accordance with a processing condition (S3). That is, the processing management unit A executes the process in accordance with the processing schedule of the processing object 33. The processing schedule shows that the service providing module 22 that executes the subsequent process is the service providing module 22*a* managed by the processing management unit A. The transmitting unit 213 of the processing management unit A transmits initial data to the service providing modules 22 managed by the processing management unit A and instructs the service providing modules 22 to process the initial data (S4). The service providing modules 22 execute the processes (S5) and transmit processing results to the processing management unit A (S6). The transmitting unit 213 receives the processing results from the service providing modules 22. Of the processing results received by the transmitting unit 213, only the processing result from the service providing module 22*a* is a normal processing result that does not include an error. Therefore, the transmitting unit 213 records the normal processing result and a processing history in the processing object 33 (S7).

The transmitting unit 213 of the processing management unit A requests a process by transmitting the processing object 33 to the processing management unit B that manages the service providing module 22*b* that executes the subsequent process (S8).

The processing management unit B executes the process in accordance with a processing condition (S9). That is, the processing management unit B acquires an intermediate processing result from the processing object 33 transmitted from the processing management unit A, transmits the intermediate processing result to the service providing modules 22, and instructs the service providing modules 22 to process the intermediate processing result (S10). The service providing modules 22 execute the processes (S11) and transmit processing results to the processing management unit B (S12). The transmitting unit 213 of the processing management unit B receives the processing results from the service providing modules 22. Of the processing results received by the transmitting unit 213, only the processing result from the service providing module **22*b* is a normal processing result that does not include an error. Therefore, the transmitting unit 213 records the normal processing result and a processing history in the processing object 33 (S13**).

The processing result from the service providing module **22*b* corresponds to a processing goal. Therefore, the transmitting unit 213 of the processing management unit B transmits the intermediate processing result to the user terminal apparatus 4 as a final processing result (S14**).

(2) Processing Schedule Determination Flow

Figure 10:
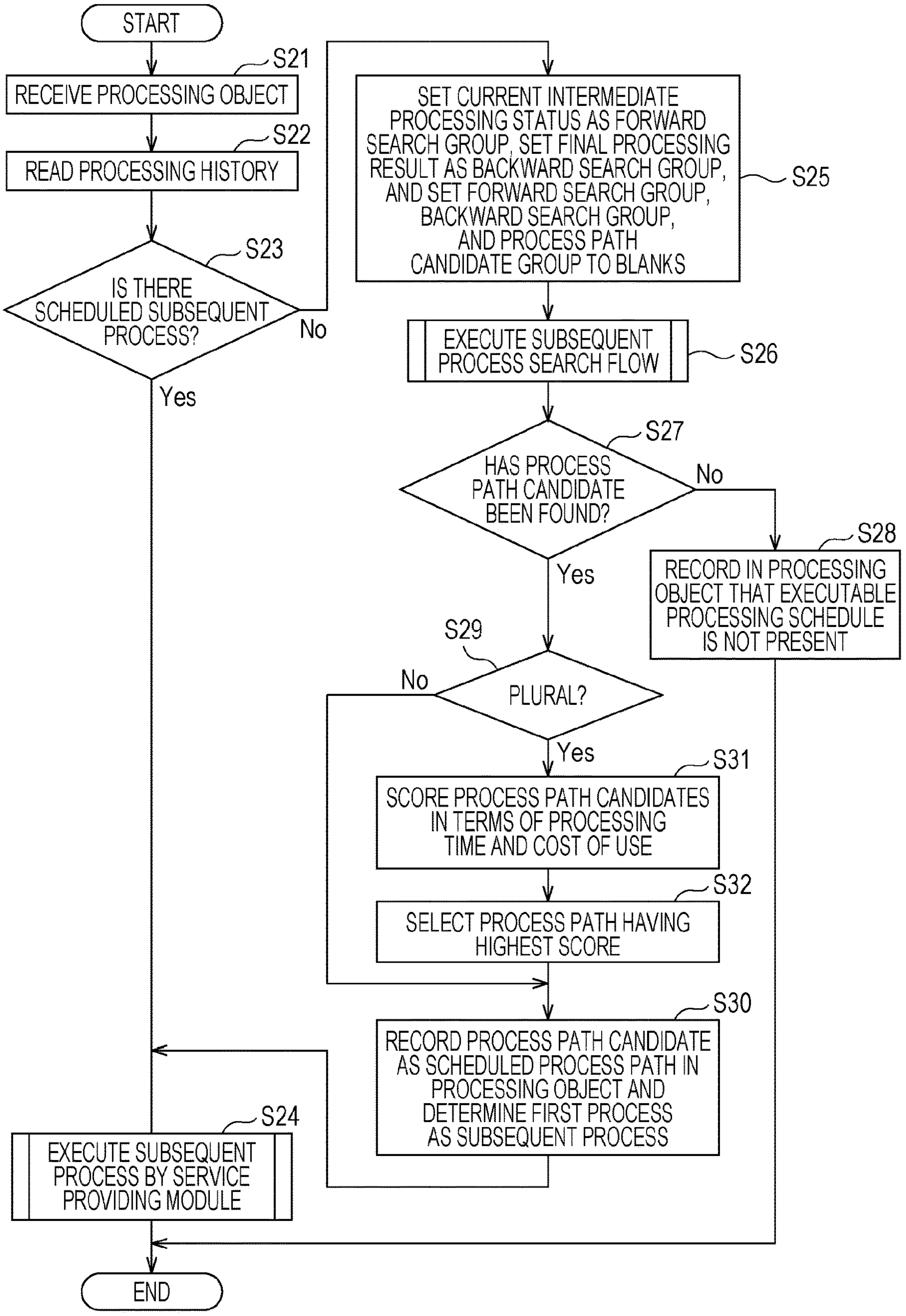
FIG. 10 is a flowchart illustrating an example of a processing schedule determination flow of a processing management unit.

Next, a processing schedule determination flow is described with reference to a flowchart of FIG. 10. FIG. 10 is a flowchart illustrating an example of the processing schedule determination flow of the processing management unit 21.

When the processing management unit 21 has received a processing object 33 transmitted from another information processing apparatus 2 (S21), the processing management unit 21 reads information from the item "processing history" of the processing object 33 (S22). The processing management unit 21 determines whether a scheduled subsequent process is recorded (S23).

When the subsequent process is recorded (S23: Yes), the processing management unit 21 instructs the service providing module 22 to execute the subsequent process (S24).

When the subsequent process is not recorded (S23: No), the processing management unit 21 sets a current intermediate processing status as a forward search group, sets a final processing result as a backward search group, and sets the forward search group, the backward search group, and a process path candidate group to blanks (S25).

The processing management unit 21 executes a subsequent process search flow (S26). The subsequent process search flow (S26) is described later.

The processing management unit 21 determines whether a process path candidate has been found (S27). When the process path candidate has not been found (S27: No), the processing management unit 21 records, in the processing object 33, that the processing management unit 21 has failed to determine an executable processing schedule (S28) and terminates the process.

When the process path candidate has been found (S27: Yes), the processing management unit 21 determines whether a plurality of process path candidates have been found (S29).

When one process path candidate has been found (S29: No), the processing management unit 21 records the process path candidate as a scheduled process path in the item "scheduling status" of the processing object 33, determines a first process as the subsequent process (S30), and instructs the service providing module 22 to execute the subsequent process (S24).

When a plurality of process path candidates have been found (S29: Yes), the processing management unit 21 scores the process path candidates in terms of a processing time and cost of use (S31). The processing management unit 21 selects a process path having a highest score (S32). Then, the processing management unit 21 proceeds to Steps S30 and S24.

(3) Subsequent Process Search Flow

Figure 11:
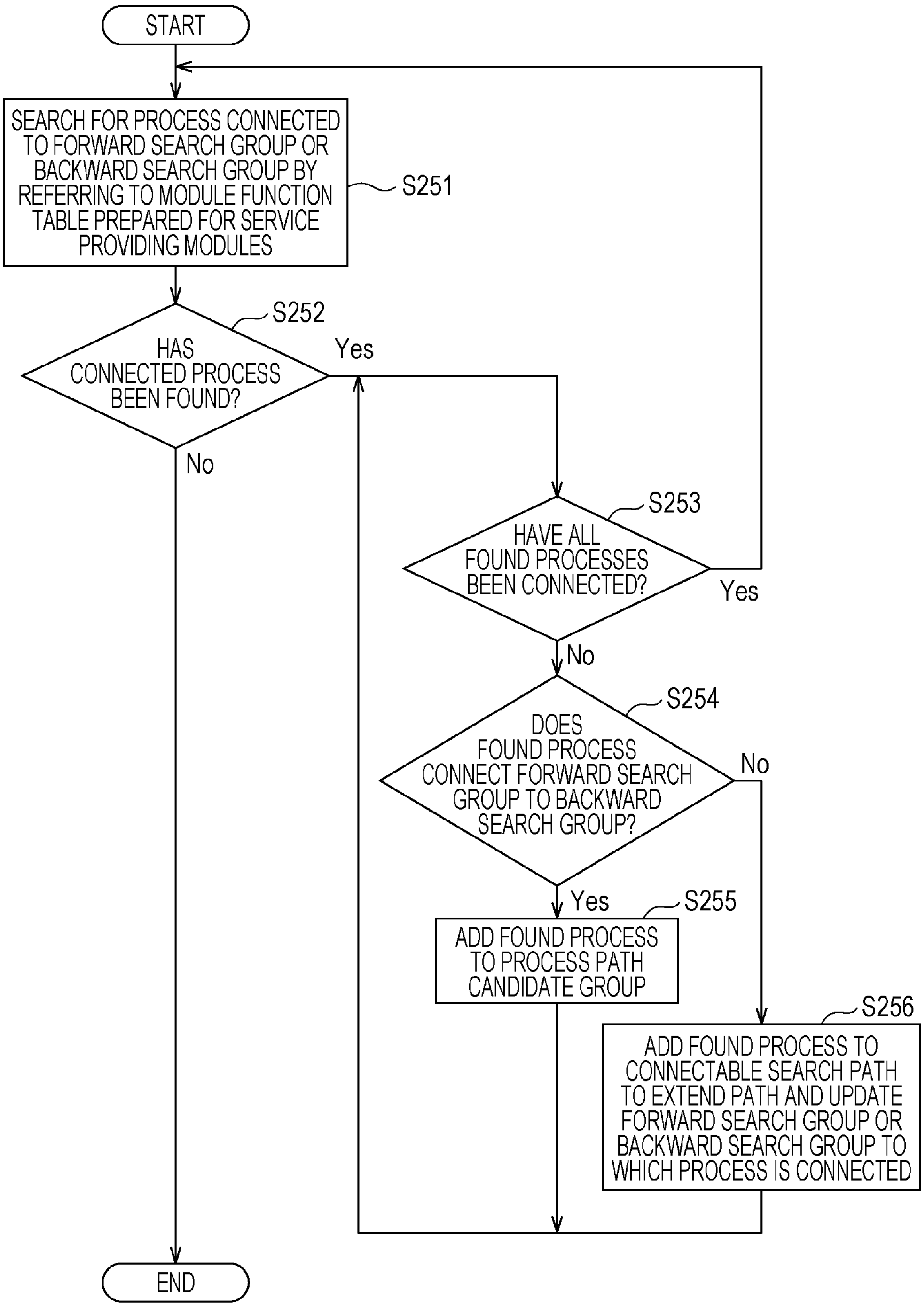
FIG. 11 is a flowchart illustrating a subsequent process search flow illustrated in FIG. 10.

Next, the subsequent process search flow (S26) illustrated in FIG. 10 is described with reference to FIG. 11.

The processing management unit 21 searches for a process connected to the forward search group or the backward search group (referred to also as "connected process") by referring to the module function table 31 in the database 3 (S251).

When the connected process has not been found (S252: No), the process is terminated. When the connected process has been found (S252: Yes), the processing management unit 21 determines whether all the found processes have been connected (S253). The processing management unit 21 determines whether the found process connects the forward search group to the backward search group (S254). When the found process connects the forward search group to the backward search group (S254: Yes), the processing management unit 21 adds the found process to the process path candidate group (S255). When the found process does not connect the forward search group to the backward search group (S254: No), the processing management unit 21 adds the found process to a connectable search path to extend the path and updates the forward search group or the backward search group to which the process is connected (S256).

Figures 6, 7:
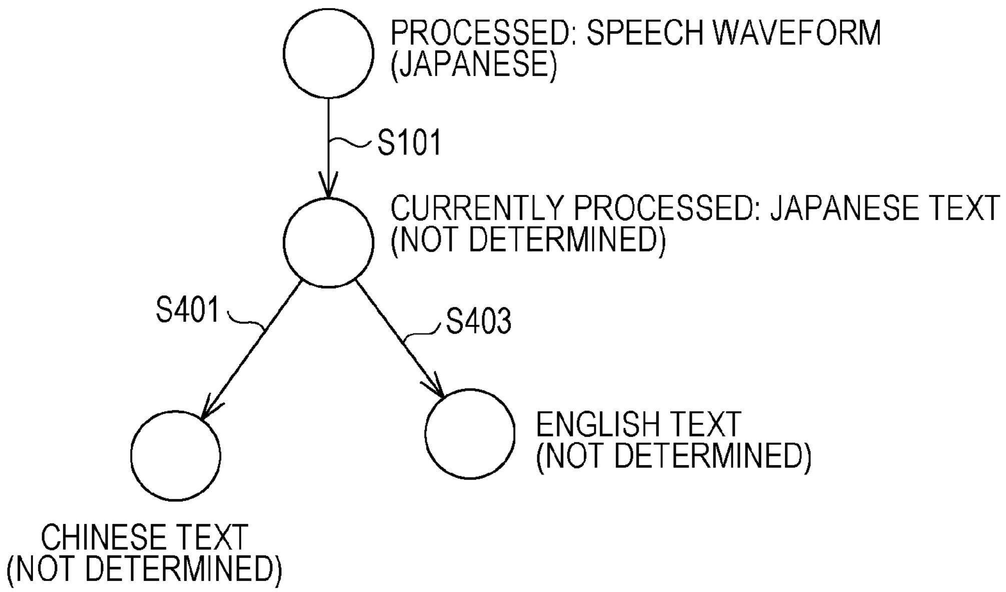
FIG. 6 illustrates an example of a record of a forward search group.
FIG. 7 illustrates the forward search group.
Figures 8, 9:
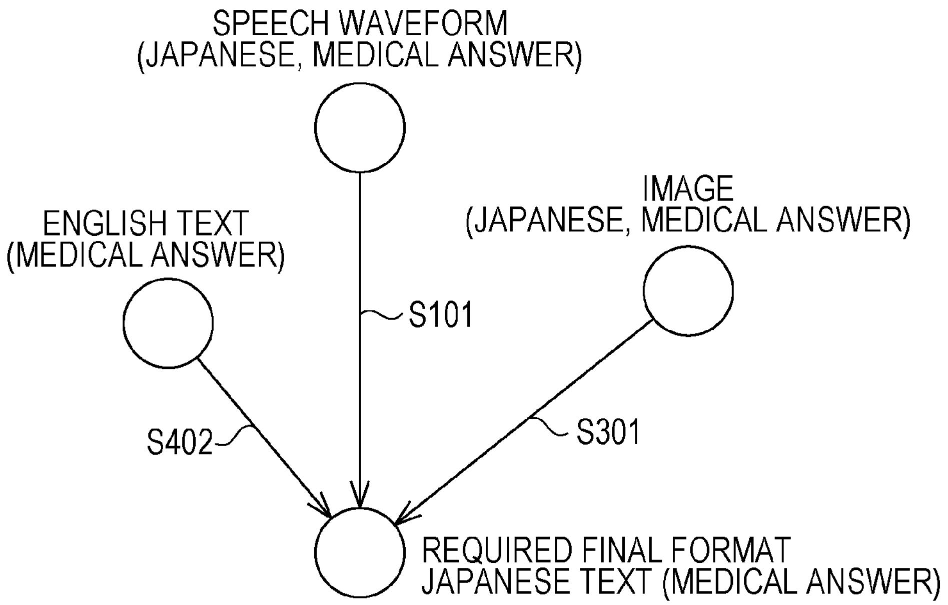
FIG. 8 illustrates an example of a record of a backward search group.
FIG. 9 illustrates the backward search group.

Specific examples are described with reference to FIG. 6 and FIG. 7 illustrating the forward search group and FIG. 8 and FIG. 9 illustrating the backward search group.

In the case of forward search illustrated in FIG. 7, the search is made as follows. That is, a speech waveform (Japanese) in a processed state (initial data) has been processed by a service providing module 22 having the module ID "S101" and the current processing state is Japanese text. When the forward search is made by referring to the module function table 31, the process branches into a process to be executed by a service providing module 22 that has the module ID "S401" and translates Japanese text into Chinese text and a process to be executed by a service providing module 22 that has the module ID "S403" and translates Japanese text into English text.

When the search condition is Chinese text as illustrated in FIG. 6, the process queue may be recorded as "S101-S401". When the search condition is English text, the process queue may be recorded as "S101-S403". Processing times and processing results associated with the module IDs of the service providing modules 22 that have finished the processes are recorded as the processing history.

In the case of backward search illustrated in FIG. 9, the search is made as follows. That is, when a medical question is determined as request details by intention understanding, a final format required as an answer is Japanese text (medical answer). When the backward search is made from this point as a starting point by referring to the module function table 31, there may be found the following three processes, that is, a process to be executed by a service providing module 22 that has a module ID "S402" and converts English text (medical answer) into Japanese text, a process to be executed by the service providing module 22 that has the module ID "S101" and converts a speech waveform (Japanese, medical answer) into Japanese text, and a process to be executed by a service providing module 22 that has a module ID "S301" and converts an image (Japanese, medical answer) into Japanese text.

When the search condition is a speech waveform (Japanese) as illustrated in FIG. 8, the process queue may be recorded as "S101". When the search condition is an image (Japanese), the process queue may be recorded as "S301". When the search condition is English text, the process queue may be recorded as "S402".

(4) Redundant Process Detection Flow

Figure 12:
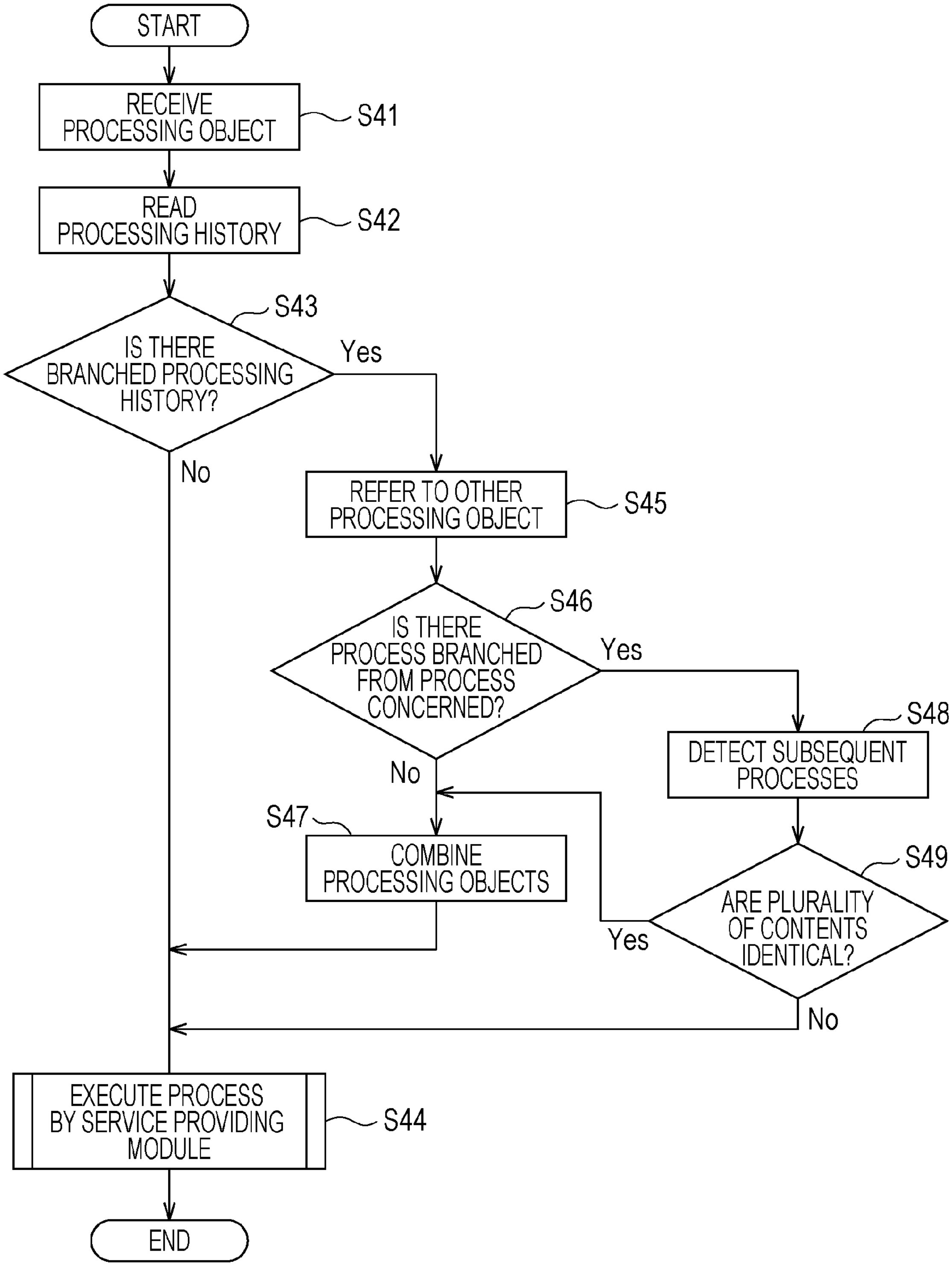
FIG. 12 is a flowchart illustrating an example of a redundant process detection flow of the processing management unit.

Next, an example of a redundant process detection flow is described with reference to FIG. 12. FIG. 12 is a flowchart illustrating the example of the redundant process detection flow of the processing management unit 21.

When the processing management unit 21 has received a processing object 33 transmitted from another information processing apparatus 2 (S41), the processing management unit 21 reads information from the item "processing history" of the processing object 33 (S42). The processing management unit 21 determines whether a branched processing history is recorded (S43).

When the branched processing history is not recorded (S43: No), the processing management unit 21 instructs the service providing module to execute a subsequent process (S44).

When the branched processing history is recorded (S43: Yes), the processing management unit 21 refers to another processing object 33 (S45) and determines whether a process branched from a process concerned is present (S46). When the process branched from the process concerned is not present (S46: No), the processing management unit 21 combines the processing objects 33 (S47) and proceeds to Step S44. Even if an adjustment process among the processing management units 21 serving as a plurality of management agents is not added, after the processing objects 33 are determined, the occurrence of an unnecessary process in which the processing objects 33 before combination are processed individually is reduced. In Step S47, one of the processing objects 33 may be selected depending on request details without combining the processing objects 33.

When the process branched from the process concerned is present (S46: Yes), the processing management unit 21 detects subsequent processes (S48) and determines whether a plurality of contents are identical (S49). When the plurality of contents are identical (S49: Yes), the processing management unit 21 proceeds to Steps S47 and S44. When the plurality of contents are not identical (S49: No), the processing management unit 21 instructs the service providing modules to execute the processes without combining the processing objects 33 (S44).

(5) Specific Example

Next, a specific example of the information processing system 1 is described with reference to FIG. 13A, FIG. 13B, and FIG. 13C. FIG. 13A illustrates an example of a processing object 33*a* recorded by the processing management units A and B. FIG. 13B illustrates an example of a copied processing object 33*b*. FIG. 13C illustrates an example of a processing object 33*c* recorded by the processing management unit A in such a manner that the processing object 33*a* illustrated in FIG. 13A and the processing object 33*b* illustrated in FIG. 13B are brought into one processing object 33*c*.

The processing management unit A manages service providing modules 22 having module IDs "S101", "S102", "S402", and "S901". The processing management unit B manages the service providing module 22 having the module ID "S403". The processing management unit C manages the service providing module 22 having the module ID "S403*b*".

The user asks a question "I have a fever, a cough, and a sore throat. What is the cause of the symptoms?" in a Japanese speech by using the microphone of the user terminal apparatus 4 (the Japanese speech is translated into English for convenience). The information processing apparatus 2A configurated by the computer A receives the question as input information.

The receiving unit 210 of the information processing apparatus 2A receives the input information including processing target data and request details from the user terminal apparatus 4. The generating unit 211 generates a processing object 33 based on the input information.

The determining unit 212 of the processing management unit 2A makes determination on a data type (in this case, speech waveform data) based on the format of the processing target data and determines a subsequent process. The determining unit 212 is not able to determine whether the language of the speech waveform data is Japanese or English and therefore extracts, from the module function table 31 illustrated in FIG. 2, module IDs in which the speech waveform data is set as the input state.

The length of the speech waveform data is equal to or larger than a predetermined length. Therefore, the determining unit 212 determines that a context recognition process is not necessary, thereby excluding a service providing module 22 that has a module ID "S201" and executes the context recognition process from the service providing modules 22 in which the input state is a speech waveform. In this case, the determining unit 212 extracts the module IDs "S101" and "S102". At the stage at which the initial data is the speech waveform data, the determining unit 211 has not yet determined a processing schedule to achieve a processing goal.

Next, the determining unit 212 acquires the name of a computer (name of a processing management unit) that manages the service providing modules 22 having the extracted module IDs "S101" and "S102" by referring to the module management table 32 illustrated in FIG. 3, determines the service providing modules 22 and the processing management unit 21 that execute the subsequent process, and records information in the processing object 33.

The module IDs "S101" and "S102" are module IDs of the service providing modules 22 managed by the processing management unit A. Therefore, the transmitting unit 213 of the processing management unit A transmits the speech waveform data to the service providing modules 22 managed by the processing management unit A and instructs the service providing modules 22 to process the speech waveform data. The service providing modules 22 process the speech waveform data and transmit processing results to the transmitting unit 213. The transmitting unit 213 recognizes that, of the processing results transmitted from the service providing modules 22, only the processing result transmitted from the service providing module 22 having the module ID "S101" is a normal processing result that does not include an error.

When the service providing module 22 having the module ID "S101" converts the speech waveform data into Japanese text as the processing result, the determining unit 212 of the processing management unit A determines, as a service providing module that executes a subsequent process, the service providing module 22 that is managed by the processing management unit A, has the module ID "S901", and executes intention understanding for Japanese text.

The transmitting unit 213 of the processing management unit A instructs the service providing module 22 having the module ID "S901" to execute the process. The service providing module 22 having the module ID "S901" understands the user's question to be a medical question and transmits a processing result to the transmitting unit 213. If the input information is Japanese text, the service providing module 22 that executes intention understanding may be instructed to execute the process first.

When the medical question is determined as the request details by intention understanding based on the processing result received by the transmitting unit 213, the generating unit 211 of the processing management unit A recognizes based on the module function table 31 that the processing goal may be achieved in the flow of Japanese text/English text→English text (question)/English text (medical answer)→English text/Japanese text.

The generating unit 211 determines a processing schedule in which the processing flow from the current stage to the goal is Japanese text/English text→English text (question)/English text (medical answer)→English text/Japanese text and records the processing schedule in the item "scheduling status" of the processing object 33*a* as illustrated in FIG. 13A.

The following processing schedule is recorded in the item "scheduling status" of the processing object 33*a* as illustrated in FIG. 13A. The service providing modules 22 having the module IDs "S101" and "S102" execute parallel processes. Next, the service providing module 22 having the module ID "S901" executes the process. Next, the service providing modules 22 having the module IDs "S403" and "S403*b*" execute parallel processes. Next, a service providing module 22 having a module ID "S711" executes a process. Next, the service providing module 22 having the module ID "S402" executes the process.

S1 to S7 in the item "intermediate processing request status" of the processing object 33*a* illustrated in FIG. 13A indicates the following records.

S1 indicates that the processing management unit A requested the service providing modules 22 having the module IDs "S101" and "S102" to execute processes at 7:50:13 on August 15.

S2 indicates that the processing management unit A received a normal processing result from the service providing module 22 having the module ID "S101" at 7:50:19 on August 15. That is, the processing result from the service providing module 22 having the module ID "S102" includes an error and is not therefore recorded. Only the normal processing result from the service providing module 22 having the module ID "S101" is recorded.

S3 indicates that the processing management unit A requested the service providing module 22 having the module ID "S901" to execute a process at 7:50:20 on August 15.

S4 indicates that the processing management unit A received a normal processing result from the service providing module 22 having the module ID "S901" at 7:50:21 on August 15.

S5 indicates that the processing management unit A requested the processing management unit B that manages the service providing module 22 having the module ID "S403" and the processing management unit C that manages the service providing module 22 having the module ID "S403*b*" to execute processes at 7:50:22 on August 15.

S6 indicates that the processing management unit B received a normal processing result from the service providing module 22 having the module ID "S403" at 7:50:23 on August 15.

S7 indicates that the processing management unit B requested the processing management unit A that manages the service providing module 22 having the module ID "S402" to execute a process at 7:50:26 on August 15.

The processing management unit C receives the processing object 33*b* illustrated in FIG. 13B from the processing management unit A.

S1 to S5 are identical to those of the processing object 33*a* of the processing management unit A.

S6 and subsequent items in the processing object 33*b* illustrated in FIG. 13B are recorded as follows.

S6 indicates that the processing management unit C received a normal processing result from the service providing module 22 having the module ID "S403*b*" at 7:50:24 on August 15.

S7 indicates that the processing management unit C requested the processing management unit A that manages the service providing module 22 having the module ID "S402" to execute a process at 7:50:28 on August 15.

The processing management unit A receives the processing object 33*a* illustrated in FIG. 13A and the processing object 33*b* illustrated in FIG. 13B.

The transmitting unit 213 of the processing management unit A that has received the processing object 33*b* illustrated in FIG. 13B records items as S8 and S9 in the processing object 33*c* as illustrated in FIG. 13C.

S8 indicates that the processing management unit A adopted the processing object 33*a* transmitted from the processing management unit B but did not adopt the processing object 33*b* transmitted from the processing management unit C in accordance with the priority "processing time oriented".

S9 indicates that the processing management unit A transmitted the processing result to the outside at 7:50:33 on August 15.

The exemplary embodiment described above is directed to the information processing system configurated by the plurality of information processing apparatuses configurated by the computers. The exemplary embodiment of the present disclosure may similarly be applied to a single information processing apparatus configurated by a plurality of computers. In the case of this information processing apparatus, the plurality of computers are connected to each other via a bus or the like.

The units of the computer may partly or entirely be configurated by a hardware circuit such as a field programmable gate array (FPGA) or an application specific integrated circuit (ASIC).

The components of the exemplary embodiment described above may partly be omitted or changed. In the flows of the exemplary embodiment described above, steps may be added, deleted, changed, or switched in the order. The programs used in the exemplary embodiment described above may be provided by being recorded in computer readable recording media such as CD-ROMs. Alternatively, the programs used in the exemplary embodiment described above may be stored in an external server such as a cloud server and used via a network.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system, comprising:

a plurality of processing circuits that execute processes for a processing target based on functions thereof;

a plurality of management circuits that manage the processing circuits; and a memory that stores information on the functions of the processing circuits in association with identification information on the management circuits and identification information on the processing circuits, wherein each of the management circuits comprises a processor configured to:

determine a processing plan including at least a subsequent process based on the processing target, storage contents of the memory, and history information on a process that has been executed for the processing target; and request a process by transmitting, to one of the management circuits that manages a processing circuit that executes the subsequent process, a processing object including the processing target, the history information, and identification information on the processing circuit that executes the subsequent process, wherein, when the processor has determined a processing plan including parallel processes that are executed in parallel by processing circuits that have the same function and are managed by the plurality of management circuits and also including one process subsequent to the parallel processes, one of the management circuits related to the one process executes a process of bringing a plurality of transmitted processing objects into one processing object and stops a subsequent process for one of the plurality of processing objects.

2. The information processing system according to claim 1, wherein the processor of each of the management circuits is further configured to receive a processing request including the processing target, and wherein the processor determines a processing plan up to obtainment of a processing result that is expected to meet the processing request.

3. The information processing system according to claim 1, wherein the process of bringing the plurality of transmitted processing objects into one processing object is a process of selecting one processing object corresponding to the processing request out of the plurality of processing objects.

4. The information processing system according to claim 1, wherein the process of bringing the plurality of transmitted processing objects into one processing object is a process of combining the plurality of processing objects into one processing object.

5. The information processing system according to claim 1, wherein, when a processing result recorded in the transmitted processing object is a final processing result, the processor transmits the final processing result to an outside without executing the subsequent process by the processing circuit that executes the subsequent process.

6. The information processing system according to claim 2, wherein, when a processing result recorded in the transmitted processing object is a final processing result, the processor transmits the final processing result to an outside without executing the subsequent process by the processing circuit that executes the subsequent process.

7. The information processing system according to claim 2, wherein, when an order of processes necessary to obtain a final processing result has been determined, the processor determines a processing plan including the order.

8. The information processing system according to claim 7, wherein, when the final processing result has been reached through forward search, the processor determines a processing plan including an order of processes obtained through the forward search.

9. The information processing system according to claim 7, wherein, when the processing target has been reached through backward search, the processor determines a processing plan including an order of processes obtained through the backward search.

10. A non-transitory computer readable medium storing a program for a computer including a plurality of processing circuits that execute processes for a processing target based on functions thereof, and a memory that stores information on the functions of the processing circuits in association with identification information on management circuits and identification information on the processing circuits, the program causing the computer to execute a process for functioning as a plurality of the management circuits that manage the processing circuits, the process comprising:

determining a processing plan including at least a subsequent process based on the processing target, storage contents of the memory, and history information on a process that has been executed for the processing target; and requesting a process by transmitting, to one of the management circuits that manages a processing circuit that executes the subsequent process, a processing object including the processing target, the history information, and identification information on the processing circuit that executes the subsequent process, in response to determining that a processing plan including parallel processes that are executed in parallel by processing circuits that have the same function and are managed by the plurality of management circuits and also including one process subsequent to the parallel processes, executing a process of bringing a plurality of transmitted processing objects into one processing object and stopping a subsequent process for one of the plurality of processing objects.

11. An information processing system, comprising:

a plurality of processing modules that execute processes for a processing target based on functions thereof;

a plurality of management means for managing the processing modules; and storage means for storing information on the functions of the processing modules in association with identification information on the management means and identification information on the processing modules, wherein each of the management means comprises:

determining means for determining a processing plan including at least a subsequent process based on the processing target, storage contents of the storage means, and history information on a process that has been executed for the processing target; and requesting means for requesting a process by transmitting, to one of the management means that manages a processing module that executes the subsequent process, a processing object including the processing target, the history information, and identification information on the processing module that executes the subsequent process, wherein, when the determining means has determined a processing plan including parallel processes that are executed in parallel by processing modules that have the same function and are managed by the plurality of management means and also including one process subsequent to the parallel processes, one of the management means related to the one process executes a process of bringing a plurality of transmitted processing objects into one processing object and stops a subsequent process for one of the plurality of processing objects.

* * * * *